Aug. 10, 1971 R. H. SPRAGUE 3,598,583

INDOMETHYLENE DYE BASES AND THEIR UTILIZATION IN PHOTOGRAPHIC PROCESSES AND COMPOSITIONS

Filed Aug. 9, 1968

ROBERT H. SPRAGUE
INVENTOR.

BY W. Gary Goodson

ATTORNEY.

United States Patent Office 3,598,583

Patented Aug. 10, 1971

3,598,583

INDOMETHYLENE DYE BASES AND THEIR UTILIZATION IN PHOTOGRAPHIC PROCESSES AND COMPOSITIONS

Robert Hicks Sprague, Chelmsford, Mass., assignor to Itek Corporation, Lexington, Mass.

Filed Aug. 9, 1968, Ser. No. 751,525
Int. Cl. G03c *7/00, 5/54, 7/36*
U.S. Cl. 96—3 21 Claims

ABSTRACT OF THE DISCLOSURE

Indomethylene dye bases containing one or more substituted or unsubstituted indole nuclei including one or more olefinic unsaturations in the five-membered ring, i.e. dye bases containing indolinyl, indoleninyl, and/or indolyl radicals; photosensitive compositions comprising such an indomethylene dye base and a free radical generating organic halogen compound; imaging media having one or more photosensitive layers incorporating a photosensitive composition therein; direct print-out processes employing photosensitive compositions and imaging media for producing photographic images.

BACKGROUND OF THE INVENTION

(1) Field of the invention

Figure 1:
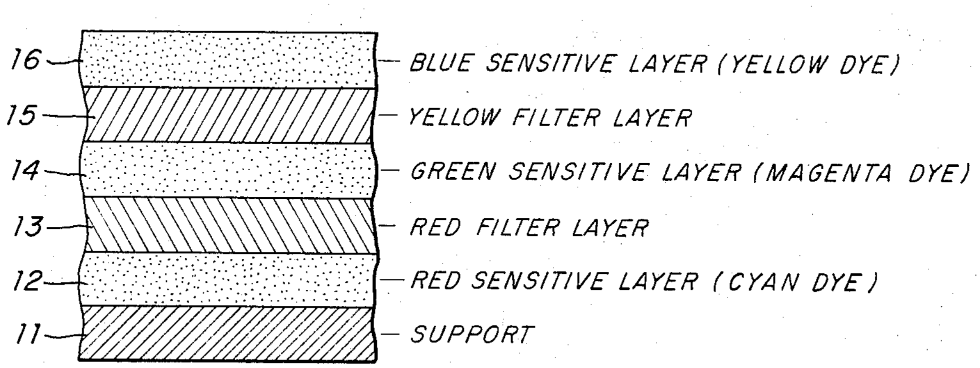

The present invention relates to certain indomethylene dye bases, to photosensitive compositions containing the same, and to processes and imaging media for producing direct printout photographic images with said compositions.

(2) Descrpion of the prior art

Light-sensitive compositions comprising certain cyanine, merocyanine, and/or styryl dye bases in combination with organic halogen compounds generating free radicals on exposure to light are known in the prior art, as taught, for example, in U.S. Pats. 3,100,703; 3,102,810; and 3,109,736. On exposure to light, the organic halogen compounds decompose to form free radicals which react with the dye bases in the compositions to form colored dyes. The compositions, when supported on a suitable carrier, can be used for the production of direct print-out photographic images.

Commonly-owned copending patent application Ser. No. 658,425, filed Aug. 4, 1967 teaches processes for producing direct positive photocopies using such systems by exposing a supported light-sensitive composition of this type to imaging light to produce a negative image copy, transferring unexposed portions of the composition to a transfer sheet in the presence of a transfer agent preferentially dissolving unexposed portions of the composition, and then exposing the transfer sheet to light to produce the positive copy. Commonly-owned copending patent application Ser. No. 658,428, filed Aug. 4, 1967, now U.S. Pat. No. 3,460,313, discloses similar dye-transfer processes for producing multi-layer full color prints by separate exposure of three supported light-sensitive compositions to imaging light from a color negative through colored filters, with transfer of each dye image formed in register to a transfer sheet. In this case, a transfer agent which is a preferential solvent for the dye formed in exposed areas of the composition is employed.

SUMMARY OF THE INVENTION

According to the present invention, a number of novel indomethylene dye bases have been discovered which, when employed in light-sensitive compositions, form dyes having improved light-fastness and improved differential solubility vis-a-vis the dye base precursors. In particular, using the dye bases of the present invention, it is possible to formulate light-sensitive compositions which on exposure to light produce, among other dyes, cyan and magenta dyes which particularly are more light-fast than those dyes formed from carbocyanine dye base precursors. The indomethylene dye bases, further, are more soluble in non-polar solvents, and are less soluble in polar solvents, than other dye bases heretofore used in the art. This permits a much improved selectivity of transfer of either an unexposed composition comprising a dye base or of an exposed composition comprising a dye from an imaging medium to a transfer sheet in the production of direct print-out positive images or of dye transfer images, respectively.

The present invention further encompasses novel imaging media including at least one layer of a photosensitive composition producing color by the reaction of free radicals with a dye base such as an indomethylene dye base, particularly multi-layer copy media incorporating three photosensitive color-producing layers therein. Processes for utilizing these imaging media include a quick process for preparing color proofs.

DESCRIPTION OF PREFERRED EMBODIMENTS

Indomethylene dye bases useful according to the present invention include those of the formula:

wherein $n$ is an integer from 0 to 2, $R_1$ and $R_2$ are each lower alkyl, and K is selected from the group consisting of (a)

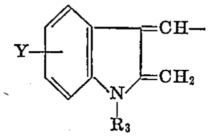

wherein $R_3$ is H or lower alkyl and Y is H or lower alkoxy;

(b)

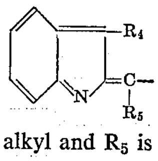

wherein $R_4$ is lower alkyl and $R_5$ is H or 3-lower alkyl-2 indolyl;

(c)

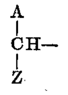

wherein A and Z are each 3-lower alkyl-2-indolyl; and (d)

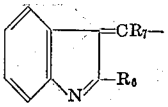

wherein $R_6$ is lower alkyl or

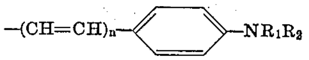

$R_7$ is H, 2-lower alkyl-3-indolyl, or

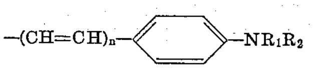

and where $n$, $R_1$, and $R_2$ have their earlier significance.

The language "indomethylene dye base" as used in the present specification and claims is intended to encompass dye bases containing one or more substituted or unsubstituted indole nuclei including one or more olefinic unsaturations in the five-membered ring, i.e. dye bases containing indolinyl, indoleninyl, and/or indolyl radicals. These materials include dye bases such as 2-methylene-3(p-dimethylamino benzylidene)-indoline

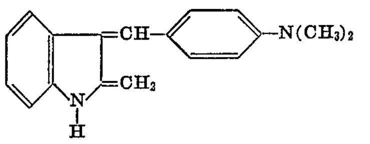

2-methylene-3(p-diethylamino benzylidene)-indoline

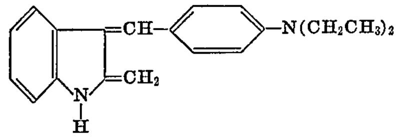

1-methyl-2-methylene-3(p-dimethylamino benzylidene)indoline

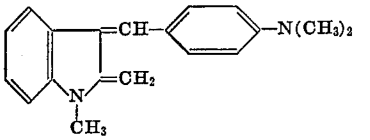

2-methylene-3-[γ-(p-dimethylamino phenyl) allylidene]indoline

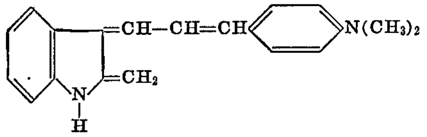

1-methyl-2-methylene-3-[γ-(p-diethylamino phenyl) allylidene]indoline

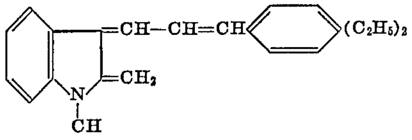

2-methyl-3-[γ-(p-diethylamino phenyl) allylidene]indolenine

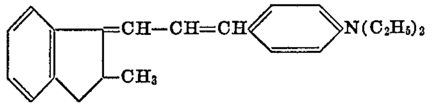

2-methyl-3-[(p-dimethylamino phenyl)-(2′-methyl-3′-indolyl)methylene]indolenine

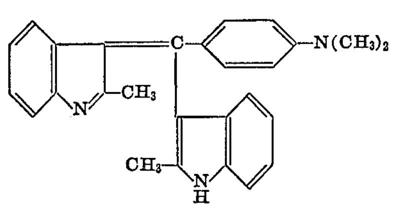

2-methylene-3-[γ-(p-dimethylamino phenyl) allylidene]-5-methoxy indoline

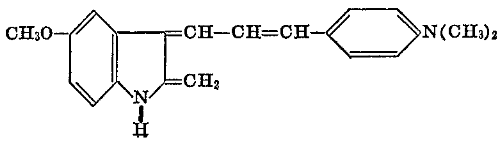

2-[γ-(p-dimethylamino phenyl) allylidene]-3-methyl indolenine

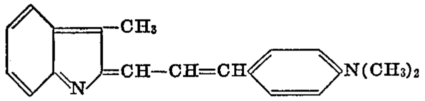

bis-[(3-methyl-2-indolyl)](p-dimethylamino phenyl) methane

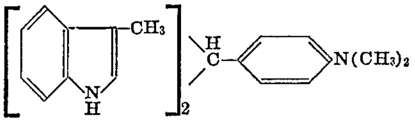

2-[(p-dimethylamino phenyl)-(3-methyl-2-indolyl)-methylene]-3-methyl indolenine

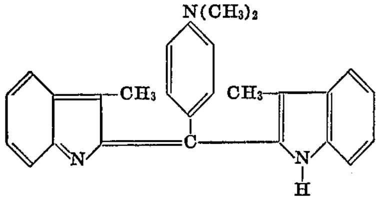

and

2-[4-(p-dimethylamino phenyl)-1,3-butadienyl]-3-(p-dimethylamino benzylidene) indolenine

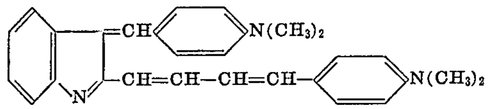

In the light-sensitive compositions according to the invention, dye bases of the type described above are employed in combination with light-sensitive free radical generating organic halogen compounds known in the prior art and having the formula $RCX_3$, wherein R is a monovalent radical which may be hydrogen, chlorine, bromine, iodine, alkyl, haloalkyl, aryl, aroyl, or aralkyl, wherein each X is chlorine, bromine, or iodine, and wherein not all of the X's need be the same. A variety of compounds falling within this category is disclosed in patents such as U.S. Pats. 3,100,703; 3,102,810; and 3,109,736. The compounds include $CCl_4$, $CBr_4$, $CHCl_3$, $CHBr_3$, $CHI_3$, $CBrCl_3$, $C_2Cl_6$, $C_2Br_6$, $C_2HBr_5$, $C_6H_5CBr_3$, and $$C_6H_5\overset{\overset{O}{\|}}{C}CBr_3$$

Of these materials, carbon tetrabromide has proved of particular utility since it can be easily incorporated into light-sensitive films or coatings and gives sensitive systems in combinaton wth the indomethylene dye bases. Although the organic halogen compounds just disclosed can be combined alone with dye bases to produce light-sensitive compositions useful according to the present invention, it has proved desirable to include certain colorless non-toxic organic sulfur compounds such as those taught in U.S. Patent 3,285,944 in the compositions. These additives function as accelerators, stabilizers, and color intensifiers. The sulfur compounds include: disulfides and hydrosulfides of the formula RSSR and RSH wherein R is the heterocyclic nucleus of a type common in cyanine chemistry; disulfides of the formula $$R'-\overset{\overset{R'}{|}}{N}-\overset{\overset{S}{\|}}{C}-S-S-\overset{\overset{S}{\|}}{C}-\overset{\overset{R'}{|}}{N}-R'$$

where R′ is H, lower alkyl, or aryl; sulfides having sulfide sulfur attached to a carbon atom in a heterocyclic ring in which the same carbon atom is attached to two atoms other than carbon; thiourea; and acyclic thioacetanilides. These activators include heterocyclic mercaptans such as 2-quinoline, 4-quinoline, 2-pyridine, 4-pyridine, imidazole, benzimidazole, thiazole, benzothiazole, β-naphthothiazole, oxazole, benzoxazole, β-naphthoxazole, selenazole, benzoselenazole, thiazoline, rhodanine, tetrazole, etc. A preferred material is 2-mercapto benzothiazole.

The light-sensitive compositions of the present invention may be imbibed directly into absorbent films or may be coated onto an appropriate substrate, usually in the presence of a suitable binder. Thus, the compositions of the present invention, dissolved in a non-polar solvent such as benzene, may be imbibed directly into "Mylar" polyester films having an absorptive coating of cellulose acetate-butyrate thereon. Alternatively, the light-sensitive materials can be formulated into a coating composition with a solvent and a film-forming binder material such as polystyrene or polyvinyl chloride and then used to coat a substrate material such as paper, wood, metal, glass or plastic.

In coatings prepared in this fashion, the dye base, the organic halogen compound, and the sulfurous accelerator (if present) are usually employed in amounts such that the dye base is present in an amount from 0.001 to 1.0 part by weight, the free radical generating organic halogen compound is present in an amount of 0.1 to 10.0 parts by weight, and the accelerator is present in an amount of from 0.001 to 1.0 part by weight, each per part by weight of film-forming binder within the resultant sensitized coating. Variation of the proportions within the ranges indicated would depend on the sensitivity sought in the coating, the intensity of the color desired in the final print, the intensity of the light source used for exposure, and the combination of dye base and free-radical generator employed in a particular case, all of which is evident to and within the knowledge of one skilled in the photographic arts.

When a film or sheet sensitized with a composition of the type described is exposed to imaging light, a monochromatic negative image will be formed substantially instantaneously within the film or sheet. Thus, a sensitized film or sheet can be used to produce monochromatic positive prints from negative images on exposure. To produce a monochromatic positive from a positive image according to the present invention, a light-sensitized film or sheet according to the present invention is exposed to the positive image and unreacted composition is next transferred from the film or sheet to a transfer sheet by bringing the transfer sheet and exposed light-sensitized sheet into contact in the presence of an agent preferentially dissolving unreacted materials.

As pointed out earlier herein, the dye bases and free-radical generating materials contemplated in the present invention are preferentially soluble in non-polar solvents such as benzene, toluene, xylene, and other liquid aromatic hydrocarbons, in aliphatic hydrocarbons such as n-hexane, n-heptane, and petroleum spirits, in cycloaliphatic hydrocarbons such as cyclopentane and cyclohexane, and in heterocyclic materials such as dioxane and the like. The dyes formed when the indomethylene dye bases react on exposure to light in the presence of a free-radical generator are, in contrast to the dye bases, salts or salt-like materials difficultly soluble in the non-polar substances just described. Hence, these non-polar solvents are suitable agents for the preferential transfer of unreacted light-sensitive composition to a transfer sheet without transfer of the salt-like dye products formed on exposure to light. The solvents can be used alone, in admixture with one another, or combined with smaller amounts of other more polar materials such as acetone.

As discussed earlier herein, because the indomethylene dye bases of the present invention are highly soluble in non-polar solvents and particularly because the salt-like dyes formed from them on exposure to light are very difficultly soluble therein, a preferential transfer of unreacted materials from a transfer sheet can be more cleanly accomplished using the present invention than the dye bases commonly used in prior art light-sensitive systems.

If transfer processes are employed, the transfer sheet need not be saturated with a transfer agent in order to effect transfer of unreacted dye base. Indeed, the mere moistening of the interface between the transfer sheet and exposed sheet, generally accomplished by moistening the surface of the transfer sheet, is usually sufficient to transfer unreacted light-sensitive composition to the transfer sheet.

After transfer of unreacted light-sensitive compositions to the transfer sheet, a colored image can be formed in the transfer sheet by exposure of the transfer sheet to light. Exposure to light may be effected by a separate exposure station in apparatus for practicing the photocopy process, for example, or the image may be developed simply by exposure to sunlight or room light without a further deliberate exposure step. In view of the photosensitivity of the compositions, exposure to room light or sunlight produces a positive image in the transfer sheet after only a short period of time.

Alternatively, an acid mordant chemically converting the dye base to its corresponding colored dye may be incorporated in the transfer sheet so that color is formed on contact.

By exposure of three compositions respectively forming yellow, magenta, and cyan dye images to a color positive through, respectively blue, green, and red filters, with transfer of unreacted material in each case to a transfer sheet, in register, a three-layer full color positive copy of the original positive color image can be produced.

Positive color copies can also be prepared from color separation positives using a process which has special utility for making color proofs in lithographic color printing processes. In this technique, a red color separation positive is used for direct print-out of a cyan image; a green positive is printed in magenta; and a blue separation positive is used to prepare a yellow print-out image. Transfer of unreacted color-formers from these three prints to a transfer sheet, in register, and development of color in situ by exposure to light or by chemical reaction will reproduce the full-color image from which the color separation positives are made.

As mentioned above, the technique can be used to proof the color separation positives made in film in the lithographic color printing of half-tones prior to using the separation positives for preparing expensive metal printing plates. If desired, a four-color proof can be prepared using an additional black printer to improve blacks in the proof print.

Full color prints can be produced by a direct positive process utilizing a multi-layer copy medium like that shown in FIG. 1 of the accompanying drawings. FIG. 1 shows an imaging medium comprising support layer 11, which may be of paper, glass, plastic, or the like. Deposited on support layer 11 is layer 12, sensitive to red light and comprising a dye base/free radical system which on exposure to red light will form a cyan dye in the layer. The dye base may be an indomethylene dye base according to the present invention or some other free-radical reactive dye base like the prior art cyanine, merocyanine, or styryl compounds.

Since the red-sensitive layer is, if not protected, also sensitive to green and blue-light, red filter layer 13 is present to screen out wavelengths shorter than red.

Green sensitive layer 14 comprises a photosensitive dye base/free radical system forming a magenta dye on exposure. Again, the composition is protected from wavelengths shorter than green by overlying yellow filter layer 15.

Top layer 16 is blue-sensitive and comprises a dye base/free radical system forming a yellow dye on exposure.

The multi-layer medium is exposed to a color image using white light, forming a negative dye image in the medium. Unreacted color-forming composition from all three layers is then transferred to a transfer sheet suitably moistened with a solvent preferentially solubilizing the unreacted material. Exposure of the transfer sheet to light provokes color formation and positive reproduction of the original positive color image or, alternatively, a mordant is present on the transfer sheet and reacts with the dye base to form colored dye (laking).

The use of a mordant (which is generally an organic or inorganic acid) not only obviates the need for a second exposure step, but has the additional advantage that the chemical reaction between the dye base and mordant on contact assures a more complete transfer of dye-forming material out of the imaging medium and into the transfer sheet. If no mordant is present, the amount of material transferred to the transfer sheet on contact depends primarily on diffusion equilibria.

The processes just described all involve transfer of unreacted dye base and free radical generating halogen compound from a light-sensitive sheet to a transfer sheet, with subsequent color-forming reactions taking place on the transfer sheet to reverse the image. However, the reacted dye, rather than unreacted color-forming composition, can instead be transferred from an exposed sheet to a transfer sheet for reproduction of the dye image or, in certain cases, for the formation of multi-layer full color prints. As pointed out earlier herein, the dyes formed on reaction of the novel indomethylene dye bases with a free radical generating organic halogen compound are preferentially soluble in polar solvents, and solvents of this type can be used to transfer the dye image after unreacted material has been removed, for instance by rinsing in a non-polar solvent. Such transfer processes can be used to reproduce the dye image, with multiple copies being made until the suply of dye on the original exposed sheet is depleted. Alternatively, three supported light-sensitive compositions producing yellow, magenta, and cyan images respectively may be exposed to a color image through blue, green, and red filters respectively. The dye image formed in each case can be then transferred, in register, to a transfer sheet to produce a color print, i.e. a positive print from a color negative.

The salt-like dye materials formed on exposure of light-sensitive compositions containing indomethylene dye bases to light are quite soluble in polar materials such as alcohols and ketones. Accordingly, the last-mentioned solvents, particularly the lower aliphatic alcohols, are particularly useful as transfer agents in transferring the dye image from a monochrome print to a transfer sheet. Again, the transfer sheet need not be saturated with transfer agent, and moistening of the interface between the transfer sheet and the dye image is sufficient.

Figure 2:
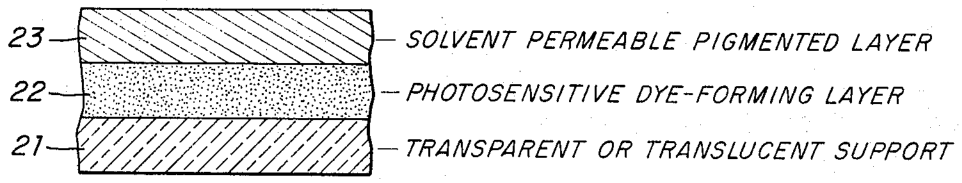

FIG. 2 of the accompanying drawings shows still another imaging medium according to the invention in which a monochromatic direct positive copy can be produced without transfer processes. The medium comprises transparent or translucent support 21, such as of paper, glass, or plastic, on which is found photosensitive layer 22 comprising a dye base/free radical system, for example employing an indomethylene dye base of the present invention or one of the cyanine, merocyanine, or styryl dye bases known in the prior art.

Top layer 23 comprises a finely-divided pigment in a solvent-permeable binder. For the preparation of black-and-white positive prints, layer 23 suitably comprises a white pigment such as $CaCO_3$, $BaSO_4$, ZnO, or $TiO_2$ and layer 22 includes a composition which generates a black dye on exposure to light.

Figures 3, 4:
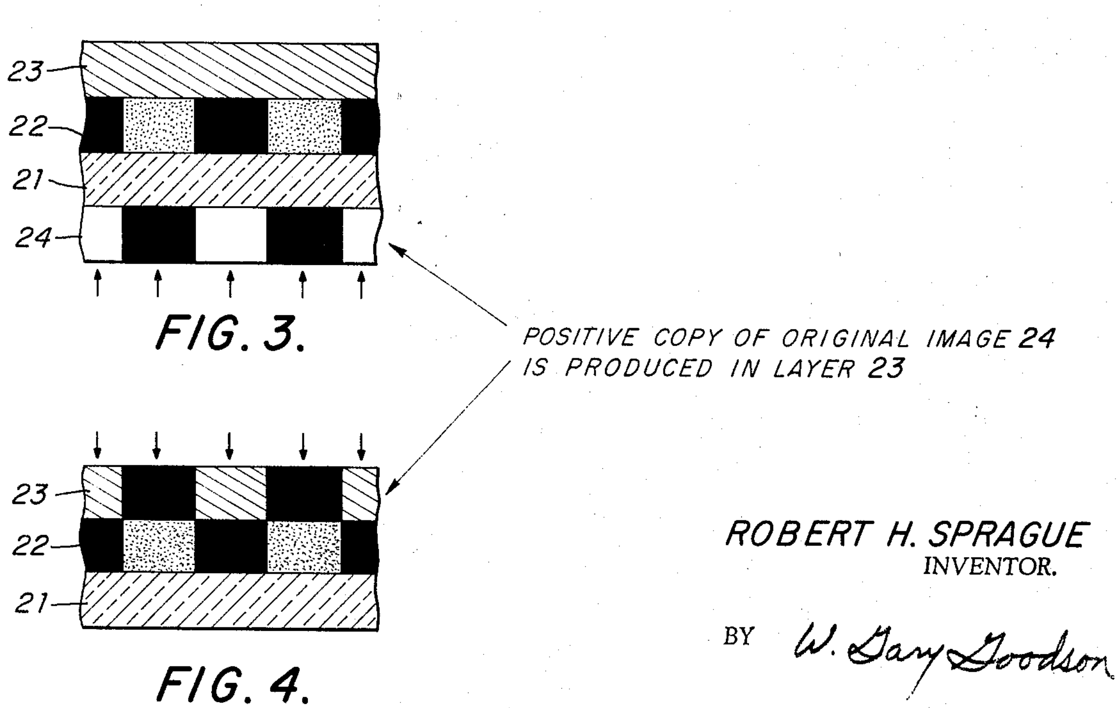

FIGS. 3 and 4 show exposure of the medium of FIG. 2 to produce a positive print. In FIG. 3, photosensitive layer 22 is exposed through light-permeable layer 21 to light from image 24 to be copied. Dye is formed in layer 22 in exposed areas (shown in black).

Solvent permeable top layer 23 is next moistened with a solvent for unreacted photosensitive composition in layer 22. The unreacted material diffuses into layer 23 and color is formed in that layer by a second exposure to light, as shown in FIG. 4. Alternatively, top layer 23 may comprise a mordant forming a colored dye (laking) with dye base diffusing from layer 22. In either case a positive dye image is formed on the pigmented background of layer 23.

A better understanding of the present invention and of its many advantages will be had by referring to the following specific examples, given by way of illustration. Examples 1–13 describe the preparation of a variety of indomethylene dye bases and their use in photosensitive compositions according to the present invention. Example 14 illustrates copy media and techniques for preparing full color positives. Example 15 describes in detail a multi-layer copy medium according to the present invention and its use, and Example 16 illustrates still other copy media for making direct print-out print.

Example 1.—2-methylene-3-(p-dimethylamino benzylidene)-indoline was prepared by suspending 38.8 grams (0.1 mol) of 2-methyl-3-(p-dimethylamino benzylidene)-pseudo indolium perchlorate [H. von Dobeneck, Zeit. Phys. Chem. 289, 271 (1952)] in 300 ml. of 50 percent methanol. 30 ml. of 28 percent $NH_4OH$ were added and the mixture was stirred until the magenta color was discharged. The precipitated solid was filtered, washed with water, and dried in vacuo over $P_2O_5$. The yield of light-brown solid was 24.5 grams, or 93 percent of theory. The crude product (5.0 grams) was dissolved in 75 ml. of methylene chloride shaken with 25 cc. of 5 percent $NH_4OH$ in a separatory funnel, and the nearly colorless methylene chloride solution of the dye base was drawn off, dried with $K_2CO_3$, filtered, and evaporated to dryness under the vacuum from a water pump. The yield of solid was 4.0 grams, having a melting point of 135°–140° C. with decomposition. The compound had an absorption maximum at 262 millimicrons, density 0.71, concentration $1/110,000$ in methanol, with a secondary peak at 287 millimicrons, density 0.29.

Example 2.—2-methylene-3-(p-diethylamino benzylidene) indoline was prepared from the corresponding diethylamino dye in the same manner as in Example 1. The compound melted at 185°–190° C. with decomposition and had an absorption maximum at 270 millimicrons, a density of 0.66 at a concentration of $1/110,000$ in methanol, and showed a secondary peak of density 0.30 at 290 millimicrons. Density and LES are reported in Tables I and II.

Example 3.—1-methyl - 2 - methylene-3-(p-dimethylamino benzylidene) indoline was prepared by suspending 37.7 grams (0.1 mol) of 1,2-dimethyl-3-(p-dimethylamino benzylidene) pseudo indolium perchlorate [cf. L. Brooker and R. Sprague, J. Am. Chem. Soc. 67, 1875 (1945)] in 250 ml. of methanol and adding 20 ml. of 28 percent $NH_4OH$. The mixture was stirred until the magenta color was discharged, the precipitate was filtered, washed with water, and dried. The yield was quantitative. The crude product was dissolved in warm $CH_2Cl_2$, chromatographed on an alumina column, eluted with $CH_2Cl_2$, and evaporated to dryness. The nearly colorless crystalline product melted at 205°–215° C. with decomposition. The product had an absorption maximum at 264 millimicrons, density 0.95, concentration $1/55000$ in $CH_2Cl_2$, with a secondary maximum of density 0.55 and 295 millimicrons. Density and LES are reported in Tables I and II.

Example 4.—2 - methylene - 3 - [$\gamma$-(p-dimethylamino phenyl) allylidene] indoline was prepared by suspending 3.0 grams (0.008 mol) of 2-methyl-3-[$\gamma$-(p-dimethylamino phenyl) allylidene] pseudo indolium perchlorate in 150 ml. of absolute ethanol. 5 ml. of triethylamine were added and the mixture was stirred vigorously for five minutes. A heavy paste of a red-brown solid was formed. This was filtered with suction, washed on the filter with 350 ml. portions of absolute ethanol, washed further with water, and dried. The yield of brown solid melting at 162°–165° C. with decomposition was 2.5 grams. The product had an absorption maximum at 290 millimicrons, density of 0.65 concentration $\frac{1}{110,000}$ in methanol.

The perchlorate described above was prepared by dissolving 6.55 grams (0.05 mol) of 2-methyl indol and 8.7 grams (0.05 mol) of p-dimethylamino cinnamaldehyde in 250 ml. of absolute ethanol. 7.0 grams (0.05 mol) of sodium perchlorate were added, followed by 14 ml. of an absolute ethanolic solution of anhydrous hydrochloric acid containing 1.83 grams (0.05 mol) of HCl. The mixture turned deep blue upon addition of the acid, and a paste of dark blue crystals was rapidly formed. After stirring for ten minutes at room temperature, the dye was filtered with suction, washed on the filter with ethanol followed by water, and dried. The yield of blue solid was 13.9 grams, or 76 percent of theory. After recyrstallization from methanol, the dye formed steel blue needles melting at 203°–206° C. with decomposition. The dye had an absorption maximum at 625 millimicrons, density 1.8, concentration $\frac{1}{210,000}$ in methanol. See Tables I and II.

Example 5.—2-methyl-3-[(p-dimethylamino phenyl)-(2′methyl-3′-indolyl) methylene] indolenine was prepared by suspending 2.0 grams of bis(2-methyl-3-indolyl)-p-dimethylamino phenyl methane in 60 ml. of methanol. This starting material was prepared by the method of British Patent 1,074,913. 0.2 gram of sodium nitrite was added to the solution and 5 ml. of concentrated HCl were added dropwise to the stirred mixture at room temperature over a period of 30 minutes. The deep red solution was made alkaline with $NH_4OH$, precipitating the pale yellow dye base. This solid was filtered, washed with water, and dried in vacuo over sodium hydroxide pellets. The yield of crude material was 1.7 grams. After recrystallization from acetone, the yield was 1.1 grams. The solid melted at 178°–181° C. with decomposition. At a concentration of $\frac{1}{110,000}$ in methanol, the compound showed an absorption maximum at 475 millimicrons, density 0.72.

Example 6.—2 - methylene - 3 - [γ-(p-dimethylamino phenyl) allylidene]-5-methoxy indoline was prepared in the same manner as the indoline compound of Example 4, except that 5-methoxy-2-methyl indol was substituted for the 2-methyl indol employed in the preparation of Example 4. The yield of the blue dye precursor was 92 percent of the theory. After recrystallization from nitromethane, the blue crystals melted at 223°–225° C. with decomposition, and had an absorption maximum at 625 millimicrons, density 1.03 at a concentration of $\frac{1}{310,000}$ in methanol plus one drop of HCl.

The blue dye precursor was converted to the dye base with $NH_4OH$ in acetone solution. The yield of the brick-red base was 82 percent of theory. The solid had a melting point of 200–210° C., decomposing with gas evolution. The material had an absorption maximum at 289 millimicrons, density 0.55, with a second peak at 275 millimicrons, density 0.54, at a concentration of $\frac{1}{110,000}$ in methanol.

Example 7.—2-[γ - (p - dimethylamino phenyl) allylidene]-3-methyl indolenine was prepared by suspending 14.4 grams of 2-[γ-(p-dimethylamino phenyl) allylidene]-3-methyl indolenine hydroperchlorate in a mixture of 200 ml. of methylene chloride and 100 ml. of water. The mixture was stirred while 10 ml. of 28 percent $NH_4OH$ were added. The blue color of the solution rapidly disappeared leaving a light-brown color in the methylene chloride layer. The latter was drawn off in a separatory funnel, washed with 100 ml. of water, again separated, and dried over anhydrous $K_2CO_3$. The solution was filtered and evaporated to dryness under water pump vacuum. 7.7 grams of a flaky brown solid were obtained in a yield of 41 percent of theory. The product decomposed at 175°–185° C. and had an absorption maxima at 305 millimicrons, density 0.59, at 375 millimicrons, density 0.3, and at 450 millimicrons, density 0.25, at a concentration of $\frac{1}{110,000}$ in methanol.

The blue dye perchlorate used in this synthesis was prepared by stirring together for ten minutes 6.55 grams (0.05 mol) of skatole, 8.75 grams (0.05 mol) of p-dimethylamino cinnamaldehyde, 7.0 grams (1.0 mol) of sodium perchlorate, 1.83 grams (0.05 mol) of anhydrous HCl, and 100 ml. of absolute ethanol. The solution became blue at once, and blue-black crystals separated rapidly from the mixture. The dye was collected by filtration, washed with three 10 ml. portions of absolute ethanol, followed by washing with water. The yield of dull green crystals was 16.1 grams, or 83 percent of theory. The product melted at 230°–231° C. with decomposition and had an absorption maximum at 583 millimicrons, density 1.36, concentration $\frac{1}{110,000}$ in acetone.

Example 8.—Bis-[(3-methyl-2-indolyl)]-(p - dimethylamino phenyl) methane was prepared by combining 6.56 grams (0.05 mol) of 3-methyl indol and 3.88 grams (0.025 mol) of p-dimethylamino benzaldehyde in 20 ml. of absolute ethanol. 5 ml. of absolute ethanol containing 1.0 gram of anhydrous HCl 0.027 mol) were added and the mixture was boiled for 8 minutes. A white crystalline solid separated, which was filtered and washed with ethanol.

Recrystallization from methanol gave 8.4 grams of white crystals, a yield of 83.8 percent of theory . The compound had a melting point of 216°–217° C. with decomposition. At a concentration of $\frac{1}{110,000}$, the compound showed an absorption maximum at 223 millimicrons, density 1.15, with a shoulder at 266 millimicrons, density 0.57.

Example 9.—2-[(p-dimethylamino phenyl)-(3-methyl 2-indolyl)-methylene]-3-methyl indolenine was prepared by dissolving 1.0 gram (0.0025 mol) of (p-dimethylamino phenyl)-bis-[(3-methyl-2-indolyl)] methane (cf. Example 8) in 100 ml. of methanol. 0.5 gram (0.007 mol) of solid $NaNO_2$ was added, followed by 8 ml. of concentrated hydrochloric acid added over a twenty minute period with constant agitation. The reaction mixture was stirred with 250 ml. of concentrated $NH_4OH$, which precipitated the dye base as a pale tan solid. The latter was filtered, washed with water, and then dried.

Recrystallization from benzene-petroleum ether (1:4) gave 0.75 gram of a pale tan solid having a melting point of 80°–82° C. with decomposition. The yield was 76.5 percent of theory. The compound had an absorption maximum at 266 millimicrons, density 0.41, at a concentration of $\frac{1}{210,000}$ in methanol.

Example 10.—2-[4-(p - dimethylamino phenyl) - 1,3-butadienyl]-3-(p-dimethylamino benzylidene)-indolenine was prepared by boiling 2.0 grams (0.006 mol) of 2-methyl-3-(p-dimethylamino benzylidene) indolium perchlorate with 1.03 grams 0.006 mol) of p-dimethylamino cinnamaldehyde for two minutes in 10 ml. of acetic anhydride with stirring. [For preparation of the indolium salt see H. von Dobeneck, Zeit. Phys. Chem. 289, 271 (1952).] The color of the solution changed from red to a purplish blue. The mixture was then chilled, diluted with 25 ml. of ethyl ether, filtered, and the solid product was washed with ether and dried. The yield of blue-black powder was 2.9 grams having a melting point above 300° C.

The product, which is the hydroperchlorate of the desired indolenine dye base, was unstable in a variety of solvents and was therefore converted directly to the desired product without purification by suspending 2.0 grams of the dye in 50 ml. of methylene chloride admixed with 50 ml. of water. 10 ml. of 28 percent $NH_4OH$ were added and the mixture was shaken in a separatory funnel until all the dye had dissolved. The light-brown methylene chloride solution was drawn off, dried with $K_2CO_3$, filtered, and chromatographed on an alumina column. Elution with $CH_2Cl_2$ separated a small amount of a yellow impurity. The desired base was eluted with 400 cc. of acetone and the solution was evaporated to dryness. The sticky brown product was dissolved in 50 ml. of benzene, filtered to remove tarry material, and the resultant product was precipitated by the addition of 200 ml. of ligroin. The yield of brown solid was 0.2 gram, having a melting point of 200°–

205° C. with decomposition. The compound shows an absorption maximum at 270 millimicrons, density 1.40, at a concentration of 1/200,000 in methanol.

Example 11.—2-methyl-3-[γ-(p-diethylamino phenyl) allylidene]-indolenine was prepared from the corresponding hydroperchlorate salt in the manner described for the synthesis of the indolenine compound of Example 7. The compound melted at 103°–105° C. Calculated for $C_{22}H_{24}N_2$ (percent): N=8.86. Found (percent): N=8.23.

The hydroperchlorate in turn was prepared by condensing 2-methyl indole with p-diethylamino-cinnamaldehyde hyde in the manner of Example 7 for the dye perchlorate synthesis described therein. The salt melted at 165°–170° C. Calculated for $C_{22}H_{25}N_2ClO_4$ (percent): N=6.72, Cl=8.51. Found (percent): N=6.53; Cl=8.32.

Example 12.—1-methyl-2-methylene-3-[γ-(p - diethylamino phenyl) allylidene]-indoline was prepared from its hydroperchlorate salt by the techniques already described for the indoline compound of Example 4. The dye base melted at 160°–164° C. and had the following analysis. Calculated for $C_{23}H_{27}N_2ClO_4$ (percent): N=6.50, Cl=8.23. Found (percent): N=7.24, Cl=7.72.

The perchlorate salt was prepared by condensing 1,2-dimethylindole with p-diethylamino cinnamaldehyde by the method of Example 4 for the salt synthesis there described.

Example 13.—Photosensitive compositions were prepared from the indomethylene dye bases of the preceding examples.

Typically, 100 mgm. of the dye base were dissolved in a mixture of 4 cc. of acetone or methylene dichloride and 4 cc. of 10 percent polystyrene in benzene. After the dye base was in solution, 1400 mg. of $CBr_4$ were dissolved therein. This mixture was coated on unsubbed "Mylar" film to form a coating having a wet thickness of 0.003 inch. The coating was permitted to air-dry for thirty minutes. Thereafter, the coating was exposed either to a photoflood lamp through a resolution target or on an Eastman Kodak sensitometer with a suitable filter. When the coating was exposed to a 500 watt photoflood lamp through a resolution target, the exposure was for a sixty second interval at a distance of 12 inches from the lamp to the test material. When the coating was exposed on the Eastman Kodak 101 sensitometer, the light was converted by the use of a 78 AA filter to equal mean noonday light. Portions of the step tablet were covered with a 58 and a 29 filter to test for green and red sensitivity. The exposure on the sensitometer was for an interval of 60 minutes unless otherwise specified.

In each case, the resulting images were fixed by rinsing three times, each time for a period of 45 seconds, in a mixture of 1 part by volume of acetone and 4 parts of petroleum ether, which removes unreacted material from the print. (Higher boiling solvents such as n-heptane and ligroin were also used in place of petroleum ether, but the acetone-petroleum ether mixture was the most efficient for removing unreacted materials without blurring of the dye image.) The density of the resulting dye image was read on a Macbeth diffuse transmission densitometer through an appropriate filter and is reported in Table I.

From the densitometer readings, the light exposure speed (LES) was calculated. The LES is defined as the reciprocal of the exposure in meter-candle-seconds required to produce a diffuse transmission density of 0.2 unit above base plus fog. The higher the LES, the faster the film. The results are given in Table II.

TABLE I

| Example | Weight (mgms.) | Density (maximum) | Base and fog |
|---|---|---|---|
| 1 | 100 | 1.96 | 0.22 |
| 2 | 50 | 1.50 | 0.22 |
| 3 | 100 | 1.98 | 0.20 |
| 4 | 100 | 1.32 | 0.36 |
| 5 | 50 | 1.22 | 0.28 |
| 6 | 12.5 | 0.68 | 0.22 |
| 7 | 50 | 0.78 | 0.20 |
| 8 | 100 | 1.10 | 0.10 |
| 9 | 200 | *0.74 | 0.07 |
| 10 | 50 | 1.04 | 0.48 |
| 11 | 50 | 0.90 | 0.44 |

*2 minutes exposure.

TABLE II

| Example | Weight (mgms.) | LES | | | Density (maximum) | | | Base and fog |
|---|---|---|---|---|---|---|---|---|
| | | 78 AA | 58 | 29 | 78 AA | 58 | 29 | |
| 1 | 100 | 9.6 $(10^{-6})$ | 5.1 $(10^{-6})$ | ------ | 1.20 | 0.40 | 0.32 | 0.20 |
| 2 | 50 | 2.41 $(10^{-6})$ | ------ | ------ | 0.48 | 0.16 | ------ | 0.10 |
| 3 | 100 | 2.64 $(10^{-5})$ | 1.07 $(10^{-5})$ | ------ | 1.85 | 0.35 | ------ | 0.06 |
| 4 | 100 | 5.27 $(10^{-6})$ | ------ | 2.83 $(10^{-5})$ | 1.16 | ------ | 0.58 | 0.30 |
| 5 | 100 | 1.91 $(10^{-5})$ | 1.23 $(10^{-5})$ | ------ | 1.75 | 0.30 | ------ | 0.10 |
| 6 | 12.5 | 3.48 $(10^{-5})$ | 4.05 $(10^{-5})$ | ------ | 1.10 | 0.70 | ------ | 0.22 |
| 7 | 50 | 4 $(10^{-6})$ | ------ | ------ | 0.58 | ------ | ------ | 0.16 |
| 8 | 100 | 2.77 $(10^{-6})$ | ------ | ------ | 0.58 | ------ | ------ | 0.12 |
| 9 | 25 | 1.21 $(10^{-5})$ | 5.1 $(10^{-6})$ | 0 | 0.72 | 0.40 | 0 | 0.20 |
| 11 | 50 | 4.39 $(10^{-5})$ | 8.08 $(10^{-6})$ | 1.34 $(10^{-4})$ | 0.94 | 0.88 | 0.87 | 0.40 |

Example 14.—Magenta, yellow, and cyan negatives were made by respectively exposing green-, blue-, and red-sensitive films comprising photosensitive dye base/free radical systems therein to white light through a color positive and appropriate filters. Unreacted color-forming material was transferred from each negative to a mordanted receptor sheet employing an oily solvent mixture as the transfer agent. The three transfers in register produced a three color positive image by laking of the mordant and color former to produce color in the transfer sheet.

The green-sensitive magenta transfer sheet was prepared by coating an unsubbed "Mylar" film with the following composition using a 0.0015" Bird applicator and drying for 30 minutes at room temperature:

2-methyl-3-(p-dimethylamino benzylidene) indolenine—50 mgm.
carbon tetrabromide—700 mgm.
acetone—2 cc.
polystyrene (10% in benzene)—2 cc.

The film was exposed to a photoflood lamp for 18 minutes through an Ektachrome color positive covered with a Wratten 2B (ultraviolet absorbing) and a 58 (green) filter to give a magenta negative.

A viscous solvent mixture comprising 1 part of acetone, 1 part of toluene, and 2 parts of mineral oil was applied to the top edge of a mordanted receptor sheet. Unreacted color-former was then transferred from the magenta negative to the receptor sheet by rolling them into contact so that the viscous transfer agent was spread between the surfaces. A magenta positive was obtained in the receptor sheet. Transfer time was 15 seconds.

A blue-sensitive film was prepared by coating "Mylar" as before with the following composition:

2-(p - diethylamino phenyl) - 5,6 - dimethoxy-benzothiazole—50 mgm.

2-mercapto-benzothiazole—25 mgm.
carbon tetrabromide—700 mgm.
acetone—2 cc.
polystyrene (10% in benzene)—2 cc.

The film was exposed to a photoflood lamp through the same color positive using a 2B filter to produce a yellow negative. Unreacted color-former was transferred in register to the mordanted receptor sheet as before. Transfer time was 15 seconds. The print now had a yellow positive overprint atop the earlier magenta.

A red-sensitive cyan printer film was prepared as before using the following composition:

1-methyl-2-methylene-3-[γ - (p-dimethylamino phenyl) allylidene] indoline—50 mgm.
carbon tetrabromide—700 mgm.
acetone—2 cc.
polystyrene (10% in benzene)—2 cc.

The film was exposed to a photoflood lamp for 12 minutes through the color positive and a 2B and 29 (red) filter to give a cyan negative. Unreacted color former was transferred to the receptor sheet in register to give a three color positive with a density range of 0.12 to 1.25.

The mordanted receptor sheet is prepared by coating a support such as subbed triacetate or single weight baryta paper, with a soluiton of an organic or inorganic acid and a suitable carrier. For the print described above, cellulose triacetate was coated using a 0.0015" Bird applicator with the following solution:

4,4'-biphenyl disulfonic acid—0.5 gm.
methanol—25 cc.
acetone—25 cc.
polyvinyl butyral—6 gm.

Coatings including other mordants forming colored lakes with dye bases of the type described can be formulated using p-nitro-phenoxyacetic acid or phosphomolybdic acid, for example.

Example 15.—A multi-layered copy medium was prepared by coating a support such as of subbed cellulose triacetate with a first photosensitive layer comprising an indomethylene dye base in combination with an organic halogen compound generating free radicals on exposure to light. Specifically, a solution was prepared comprising 0.025–0.10 gram of 1-methyl-2-methylene-3[γ-(p-dimethylamino phenyl) allylidene] indoline,

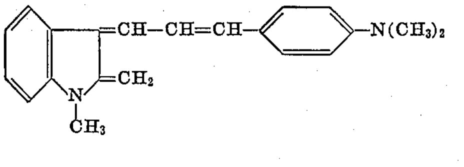

in 4 ml. of acetone (or methylene chloride) mixed with 4 ml. of a 10 percent solution of polystyrene in benzene. 1.4 grams of carbon tetrabromide were then dissolved in the mixture. Finally, from 0.1 percent to about 1 percent, by weight of the indomethylene dye base, of a dye sensitizing the composition to red light was added. Specifically, this dye was

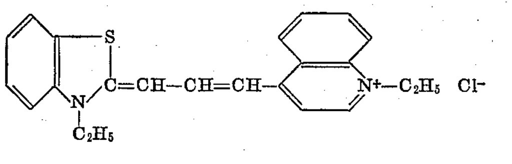

The composition was coated on the substrate to a 0.003" wet thickness, then dried for 20 minutes at room temperature in the dark.

A red resinous filter layer containing the red azo dye

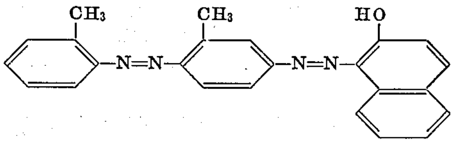

was next applied over the red sensitive layer by cast coating techniques involving precasting of the red filter layer in a condition sufficiently tacky to be capable of forming bonds with other layers contacted therewith. The filter layer is precast onto a temporary backing such as a conventional release paper, dried to a tacky condition and then rolled into contact with the red sensitive layer for lamination therewith.

A green-sensitive layer is then applied over the red filter layer, suitably by cast coating techniques. The green-sensitive layer, which contains an indomethylene dye base forming magenta dye on exposure to light, is prepared from a combination of acetone or methylene chloride with a polystyrene solution of benzene and includes carbon tetrabromide, as for the red-sensitive layer. The indomethylene dye base is

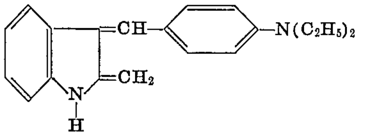

Finally, the layer contains a dye sensitizing it to green light, which dye has the following structure:

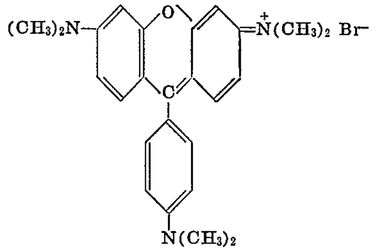

A yellow filter layer having a polystyrene base is next cast coated on top the green sensitive layer. The yellow dye of this filter layer has the structure

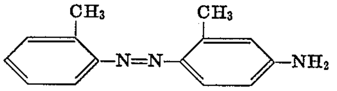

Finally, a blue sensitive layer prepared from a polystyrene solution of the type earlier described having carbon tetrabromide therein is prepared using an aromatic amine dye base of the structure:

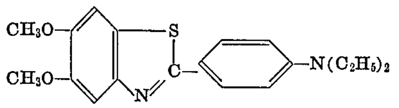

A full color positive print is made by exposing the above-described copy medium for from 1 to 2 minutes to a suitable source of white light through the image to be capied. A mordanted receptor sheet is moistened with a non-polar solvent such as a mixture of 1 part of ethyl acetate with 4 parts of n-heptane and is then contacted with the exposed copy medium for a time sufficient to transfer unexposed, unreacted, dye bases to the receptor sheet where they react with the mordant to form dyes reproducing the original image.

If the receptor sheet does not contain a mordant of the type earlier described herein, the receptor sheet is suitably exposed to a source of white light after transfer of unreacted color-formers thereto, whereupon a full color print is reproduced in the receptor sheet.

Example 16.—A copy medium for preparing direct print-out black-and-white prints was prepared by coating one side of a transparent cellulose acetate supporting film with a photosensitive composition containing the following materials, and then drying the coating at room temperature:

2[γ-(p-dimethylaminophenyl)allylidene]-3-methyl indolenine—50 mgm.
carbon tetrabromide—700 mgm.
acetone—2 cc.
polystyrene (10% in benzene)—2 cc.

This layer was then overcoated with a pigmented organic solvent-permeable film laid down from a suspension of 5 grams of finely divided $TiO_2$ (0.3–0.4 micron) in 10 cc. of a 15 percent solution of hydroxypropyl cellulose.

After the overcoating layer was dry, the photosensitive layer was exposed to imaging light through the transparent tri-acetate base to form a negative image in the former.

The pigmented overcoating layer of the copy medium was next moistened with a solvent mixture comprising 20 parts by volume of toluene and 5 parts by volume of acetone, causing unexposed photosensitive composition to enter the pigmented layer from the underlying coating.

The pigment layer was next exposed to light whereupon the photosensitive composition now present in the layer darkened to produce a positive copy of the original image comprising black dye on a background of the white pigment layer.

Other styryl, cyanine, merocyanine, or indomethylene dye bases, in combination with other organic halogen compounds, may be substituted for the black-printing indolenine dye base and carbon tetrabromide of this example, and other pigments (including non-white pigments) can be employed in the pigmented layer, to produce prints in color combinations other than black-and-white.

Other binders, e.g. hydroxypropyl methyl cellulose, which are permeable to non-polar solvents but are not dissolved by them, can be used in compounding the pigmented layer.

To obviate the second exposure step described above, an acid mordant such as those mentioned in Example 14 above can be incorporated in the pigment layer. When unreacted dye base is brought into the pigment layer by the action of solvent, it reacts with the mordant to form visible color.

The multi-layer medium of Example 15 can be modified in structure to permit making full color prints without transfer by incorporating a pigment layer therein. Because exposure of such a medium is through the support, a transparent support must be used and the layers of Example 15 would be deposited in reverse order, i.e. with the blue-sensitive layer closest to the support and the red-sensitive layer farthest. The pigment layer is then deposited on the red-sensitive layer.

What is claimed is:

1. A light sensitive composition for producing direct print-out photographic images which comprises a free radical generating organic halogen compound and an indomethylene dye base of the formula

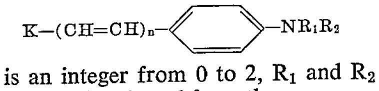

wherein $n$ is an integer from 0 to 2, $R_1$ and $R_2$ are each lower alkyl, and K is selected from the group consisting of (a)

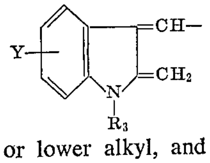

wherein $R_3$ is H or lower alkyl, and Y is H or lower alkoxy;

(b)

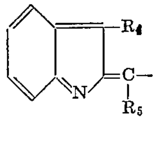

wherein $R_4$ is lower alkyl and $R_5$ is H or 3-lower alkyl-2-indolyl;

(c)

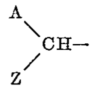

wherein A and Z are each 3-lower alkyl-2-indolyl; and (d)

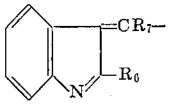

wherein $R_6$ is lower alkyl or

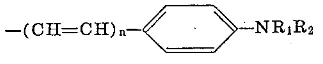

$R_7$ is hydrogen, 2-lower alkyl-3-indolyl, or

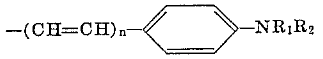

and where $n$, $R_1$ and $R_2$ have their earlier meaning

2. A process for producing a direct print-out photographic image which comprises exposing a supported light-sensitive composition as claimed in claim 1 to activating radiation, whereby a colored dye is formed in light-struck areas of said supported composition.

3. A process as in claim 2 wherein colored portions of said direct print-out image are transferred to a receptor surface in the presence of a transfer agent in which said colored dye, present in light-exposed areas, is preferentially soluble as compared with unreacted dye base.

4. A process as in claim 3 wherein colored portions of said direct print-out image are transferred to a receptor surface in register with a different-colored print of said image to prepare a polychromatic image.

5. A process as in claim 2 wherein, after exposure to form said direct print-out image, unexposed portions of said composition, comprising unreacted dye base, are transferred to a receptor surface in the presence of a transfer agent in which said unreacted dye base is preferentially soluble as compared with said colored dye.

6. A process as in claim 5 wherein said receptor surface is exposed to light after said transfer to form a colored dye image therein.

7. A process as in claim 5 wherein said receptor surface comprises a mordant reacting with transferred unreacted dye base to form a colored dye image in said sheet.

8. A process as in claim 6 wherein said colored dye image is formed in said receptor surface in register with a different colored print of said image to prepare a polychromatic image.

9. A process as in claim 7 wherein said colored dye image is formed in said receptor surface in register with a different colored print of said image to prepare a polychromatic image.

10. A multi-layer imaging medium comprising a support and red, green, and blue-sensitive photosensitive layers thereon, each of said photosensitive layers containing a photosensitive composition comprising a dye base and free radical generating organic halogen compound, said compositions reacting on exposure to light respectively to form a cyan, magenta, and yellow dye, at least one of said dye bases comprising an indomethylene dye base.

11. A process for producing a direct print-out photographic image, which comprises exposing a multi-layer imaging medium as in claim 10 to imaging light to produce therein a full-color direct print-out image comprising cyan, magenta, and yellow dyes formed in said photosensitive layers.

12. A process as in claim 11 wherein, after exposure to produce said full-color direct print-out image, unexposed portions of said compositions, comprising unreacted dye bases, are transferred to a receptor surface in the presence of a transfer agent in which said unreacted dye bases, present in non-light struck areas, are preferentially soluble as compared with said colored dyes.

13. A process as in claim 12 wherein said receptor surface is exposed to light after said transfer to form a full-color dye image therein.

14. A process as in claim 12 wherein said receptor surface comprises a mordant reacting with said transferred unreacted dye bases to form a full-color dye image therein.

15. An imaging medium comprising a light-permeable support, at least one photosensitive layer thereon including a photosensitive composition comprising a dye base and a free radical generating organic halogen compound, said composition reacting on exposure to light to form a colored dye, and a pigmented layer over said photosensitive layer, said pigmented layer being permeable to a solvent for said dye base.

16. An imaging medium as in claim 15 wherein said pigmented layer includes a mordant capable of reacting with said dye base to form a colored dye.

17. A process for producing a direct print-out photographic image which comprises exposing an imaging medium as in claim 15 to imaging light through said light permeable support to produce a direct print-out image in said photosensitive layer, moistening said permeable pigmented layer with a solvent for unreacted dye base present in said photosensitive layer to bring said unreacted dye base into said pigmented layer, and then exposing said pigmented layer to light to form a dye image therein.

18. A process for producing a direct print-out photographic image which comprises exposing an imaging medium as in claim 16 to imaging light through said light permeable support to produce a direct print-out image in said photosensitive layer, and then moistening said permeable pigmented layer with a solvent for unreacted dye base present in said photosensitive layer to bring said unreacted dye base into said pigmented layer where it reacts with said mordant therein to form a dye image.

19. The method of making positive direct print-out images which comprises exposing a photosensitive composition to imaging light, said composition comprising a dye base and a free-radical generating organic halogen compound and reacting on exposure to light to form a colored dye, and then transferring unexposed portions of said composition comprising unreacted dye base to a receptor surface comprising a mordant reacting with said transferred dye base to form a colored dye image.

20. A process as in claim 19 wherein said dye base is a styryl, cyanine, merocyanine, or indomethylene dye base.

21. A process as in claim 20 wherein said mordant is 4,4′-biphenylene sulfonic acid, p-nitro-phenoxyacetic acid, or phosphomolybdic acid.

References Cited

UNITED STATES PATENTS

| | | | |
|---|---|---|---|
| 3,102,027 | 8/1963 | Sprague et al. | 96—47 |
| 3,445,228 | 5/1968 | Beavers et al. | 96—3 |

NORMAN G. TORCHIN, Primary Examiner

A. T. SURO PICO, Assistant Examiner

U.S. Cl. X.R.

96—29, 90

UNITED STATES PATENT OFFICE
CERTIFICATE OF CORRECTION

Patent No. 3,598,583 Dated March 8, 1972

Inventor(s) Robert H. Sprague

It is certified that error appears in the above-identified patent and that said Letters Patent are hereby corrected as shown below:

Col. 1, lines 56-57, cancel "Commonly-owned copending patent application Ser. No. 658,428, filed Aug. 4, 1967, now U. S. Pat. No. 3,460,313," and insert therefor --- Commonly-owned copending patent application Ser. No. 658,424, filed Aug. 4, 1967, now abandoned, ---.

Signed and sealed this 5th day of September 1972.

(SEAL)
Attest:

EDWARD M.FLETCHER,JR.
Attesting Officer

ROBERT GOTTSCHALK
Commissioner of Patents